US 6,183,289 B1

(12) United States Patent
Lake et al.

(10) Patent No.: US 6,183,289 B1
(45) Date of Patent: Feb. 6, 2001

(54) I/O CONNECTOR MODULE FOR A FIELD CONTROLLER IN A DISTRIBUTED CONTROL SYSTEM

(75) Inventors: Harold Lake, Sharon; Charles Piper, Foxboro; David P. Prentice, Attleboro; Simon Korowitz, Sharon, all of MA (US)

(73) Assignee: The Foxboro Company, Foxboro, MA (US)

(*) Notice: Under 35 U.S.C. 154(b), the term of this patent shall be extended for 0 days.

(21) Appl. No.: 09/317,403

(22) Filed: May 24, 1999

Related U.S. Application Data

(60) Division of application No. 08/725,740, filed on Oct. 4, 1996, which is a continuation-in-part of application No. 08/560,167, filed on Nov. 20, 1995.

(51) Int. Cl.[7] .................................................. H01R 11/00
(52) U.S. Cl. ........................................ 439/449; 439/942
(58) Field of Search .................................. 439/449, 502, 439/76.1, 716, 77, 493, 942; 710/102

(56) References Cited

U.S. PATENT DOCUMENTS

| 4,626,962 | 12/1986 | Ahn et al. ............................ 439/76.1 |
| 4,797,513 | 1/1989 | Ono et al. ............................ 174/153 |
| 5,043,847 | 8/1991 | Deinhardt et al. ................... 439/76.1 |
| 5,133,668 | 7/1992 | Brown ................................. 439/76.1 |
| 5,167,047 | 12/1992 | Plumley ................................... 16/2 |
| 5,357,573 | 10/1994 | Walters .................................. 380/25 |
| 5,377,268 | 12/1994 | Hunter .................................. 380/23 |
| 5,501,608 | 3/1996 | Scheer et al. ........................ 439/218 |
| 5,509,811 | 4/1996 | Homic .................................. 439/55 |
| 5,540,597 | 7/1996 | Budman et al. ........................ 439/77 |
| 5,564,055 | 10/1996 | Asnaashari et al. ................. 395/800 |
| 5,567,180 | 10/1996 | Seo ....................................... 439/638 |
| 5,649,121 | 7/1997 | Budman et al. ...................... 395/281 |

FOREIGN PATENT DOCUMENTS

| 0 109 734 A2 | 5/1984 | (EP) . |
| 0 499 695 A2 | 8/1992 | (EP) . |
| 0 658 851 A2 | 6/1995 | (EP) . |
| 0 672 987 A2 | 9/1995 | (EP) . |
| WO 94/06071 | 3/1994 | (WO) . |
| WO 94/11802 | 5/1994 | (WO) . |

OTHER PUBLICATIONS

Supplemental Search Report, EP 96 94 0580; Nov. 9, 1998, The Hague; L. Hauser.

*Primary Examiner*—Neil Abrams
*Assistant Examiner*—Eugene G. Byrd
(74) *Attorney, Agent, or Firm*—David Barron; Jules Jay Morris; Terrence Martin

(57) ABSTRACT

An article adapted to pass a cable through a housing includes a substantially solid body, including front and rear ends. A side surface of the body provides a groove extending into the body from the front to the rear end. The groove is sized to carry a selected size electric cable. The body also includes connective structure adapted to removably connect the body to the housing. The article also includes a sheet of nonconductive material extending across the groove at the front end of the body. The sheet provides a circular opening sized to allow the cable to pass therethrough. The sheet also has a slit extending from the side surface to the circular opening. The sheet is fabricated of a resilient material and is structured to allow the cable to be inserted through the slit and into the circular opening such that the cable extends along the groove and extends into the housing from the rear end of the body when the body is connected to the housing.

9 Claims, 16 Drawing Sheets

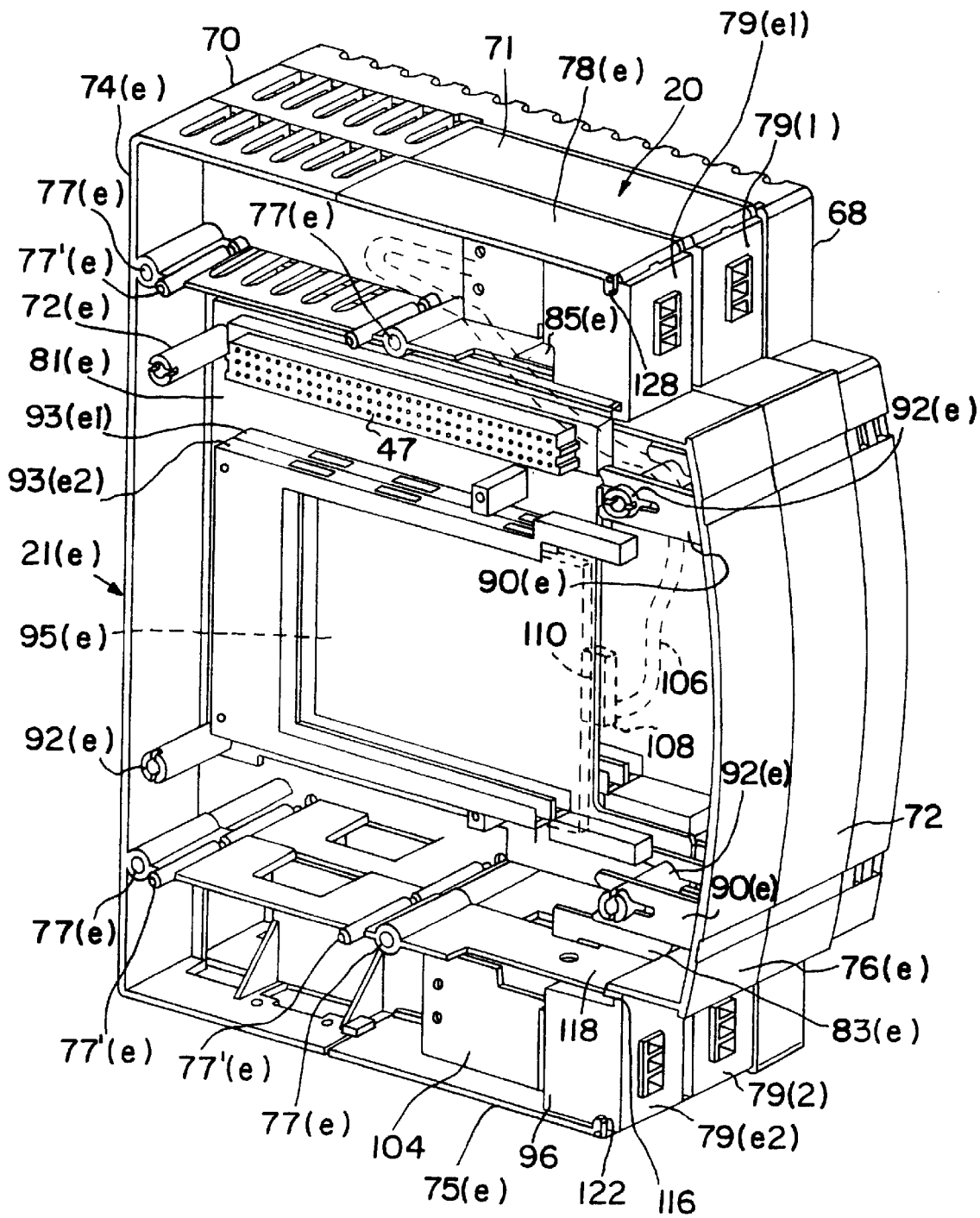
F I G. 6

I/O CONNECTOR MODULE FOR A FIELD CONTROLLER IN A DISTRIBUTED CONTROL SYSTEM

This application is a division of application Ser. No. 08/725,740, filed Oct. 4, 1996, which is a continuation-in-part of co-owned application Ser. No. 08/560,167, filed Nov. 20, 1995, to Korowitz et al., for "Distributed Control System Including A Compact Easily-Extensible And Serviceable Field Controller," and is related to application Ser. No. 08/725,741, filed on Oct. 4, 1996, to Harold Lake and Charles Piper, for "Expandable Field Controller in a Distributed Control System."

BACKGROUND OF THE INVENTION

The invention relates generally to the field of digital data processing systems for distributed monitoring and control in industrial environments, and in particular to a compact, modularly expandable controller (called herein a "field controller") and internal dongles adapted for use with the controller.

Distributed control systems are often used in a number of commercial, industrial and home applications, in particular to monitor and control operations at manufacturing, chemical processing and similar industrial operations, to monitor and control environmental and other factors and so forth. In a manufacturing operation, a distributed control system will typically control machines which facilitate the manufacture and assembly of the products being manufactured. In addition, in a chemical processing operation, a distributed control system may control valves to control rates of flow of chemicals into and out of reaction chambers, and monitoring and/or controlling reaction temperatures and pressures and the like which are required to carry out the chemical process. In addition to controlling the manufacturing or chemical process, distributed control systems may perform bookkeeping operations to keep track of the inventory of inputs required for the manufacturing or chemical process, as well as the inventory of outputs produced by the operation. Typical distributed control systems essentially comprise large, centrally-located and expensive computer systems, which can be expensive to maintain and typically have limited expansion capabilities.

A control system may include one or more PCMCIA cards that each couple to a device in the industrial environment, such as, for example, an instrument, monitor, machine or the like. Often, it is advantageous to include an active or passive circuit in the coupling between the controller and the device. The cable may include the circuit. In one arrangement, called a "dongle," the cable has an encapsulated end portion that includes the active or passive circuit and a connector.

SUMMARY OF THE INVENTION

The invention provides a relatively compact, computationally powerful, easily-extendable and easily serviceable field controller for use in a variety of industrial, commercial and home applications.

According to one aspect of the invention, a field controller for use in a distributed control system with an area controller manages at least one controlled device in an industrial process operation. The field controller includes a processor module segment through which it can control a selected number of devices. The field controller may also include one or more expansion module segments, each having at least one PCMCIA card coupled to the process control segment to enable it to control a larger number of controlled devices. The processor module segment includes a processor module and at least one local interface module for interfacing to a controlled device, and the expansion module segment includes interface modules for interfacing to other controlled devices. In the processor module segment, the processor module and the local interface module are interconnected by a bus segment, which is also connected to an upstream off-module connector. Each expansion module segment includes at least one interface module, and also includes a downstream off-module connector and an upstream off-module connector, which are interconnected by a bus segment. The downstream off-module connector of each expansion module segment is adapted to mate with the upstream off-module connector of the processor module segment and of other expansion module segment, so as to facilitate the interconnection of the processor module segment and a sequence of expansion module segments by establishing a unitary multi-drop bus comprising the processor module's bus segment and the bus segments of expansion module in the sequence. The processor module controls each controlled device through the respective local interface module or expansion interface module connected thereto. The processor module segment and each expansion module segment are each mounted in a housing segment which is configured to form a unitary housing when they are interconnected.

A benefit of this arrangement is that the number of controlled devices which can be controlled by the field controller be easily increased or decreased by adding expansion module segments to, or removing them from, the field controller. Since the bus created by the series of bus segments is an extensible multi-drop bus, the controlled devices can be connected to the field controller through any interface module connected into the field controller along the bus. Since the processor module segment and each expansion module segment also includes an integral housing segment, when the processor module segment and expansion module segments are connected together they provide a unitary, compact housing which is convenient in a commercial, industrial or home environment.

According to another aspect of the invention, an industrial computing device, such as a field controller, includes a field mountable housing. The housing includes a primary housing with first and second side covers, and a removable front cover. The first side cover is structured and arranged to provide access to a processor within the housing from a first lateral side of the primary housing. The first side cover includes a mount on a rear side structured and arranged to mount the housing to a DIN rail. The mount is adapted to electrically connect to a ground bus within the primary housing with the first side cover coupled to the primary housing. At least one peripheral connector within the housing is adapted to receive at least one PCMCIA card such that when the PCMCIA card is plugged into the peripheral connector, the PCMCIA card is also within the housing and electrically coupled to the processor. An expansion connector is adapted to receive an expansion board which includes at least one more peripheral connector which itself is adapted to receive at least one more PCMCIA card. The second removable side cover is structured and arranged to provide access to the expansion connector from a second lateral side of the primary housing. The peripheral connector, the expansion connector, the primary housing and the first and second side covers are oriented orthogonal to a mounting plane of the industrial computing device.

The primary housing includes I/O structure for mounting at least one I/O connector in a recess of the housing such that it is integral with the housing. The recess may be provided between the front cover and a hinged lid at a top or bottom end of the primary housing. A ground bus includes a connector which is structured and arranged to electrically couple to a body of the I/O connecter when mounted to the housing. The I/O connector may be an internal dongle which includes a body including connective structure being arranged to removably attach the body to the primary housing, and a circuit assembly, including an exterior connector on the body for electrically connecting to an external electronic device, a dongle circuit being electrically coupled to the external connector through the body, an electronic cable having a first end electrically coupled to the dongle circuit, and a second end including a connector being structured and arranged to connect to an electronic component within the housing, such as, for example, the PCMCIA card. The dongle circuit may include a passive circuit, an active circuit, or both on a circuit board attached to the body.

The industrial computing device may further include an expansion module which includes the expansion board in an expansion housing. The expansion module mechanically couples between the primary housing and the second side cover and is oriented orthogonal to the mounting plane of the industrial computing device. Each of the primary housing and the expansion housing including a recess and other structure for mounting at least one I/O connector integral with the primary housing and the expansion housing, respectively. The expansion module may further include a second expansion connector adapted to receive a second expansion board in a second expansion module. The second expansion board includes at least one more peripheral connector being adapted to receive at least one more PCMCIA card. An addressing circuit automatically assigns the PCMCIA cards unique addresses wherein individual addressing of the PCMCIA cards is unnecessary.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 6 is a perspective view of a head unit coupled to an expansion module and a side cover;

Figure 16A:
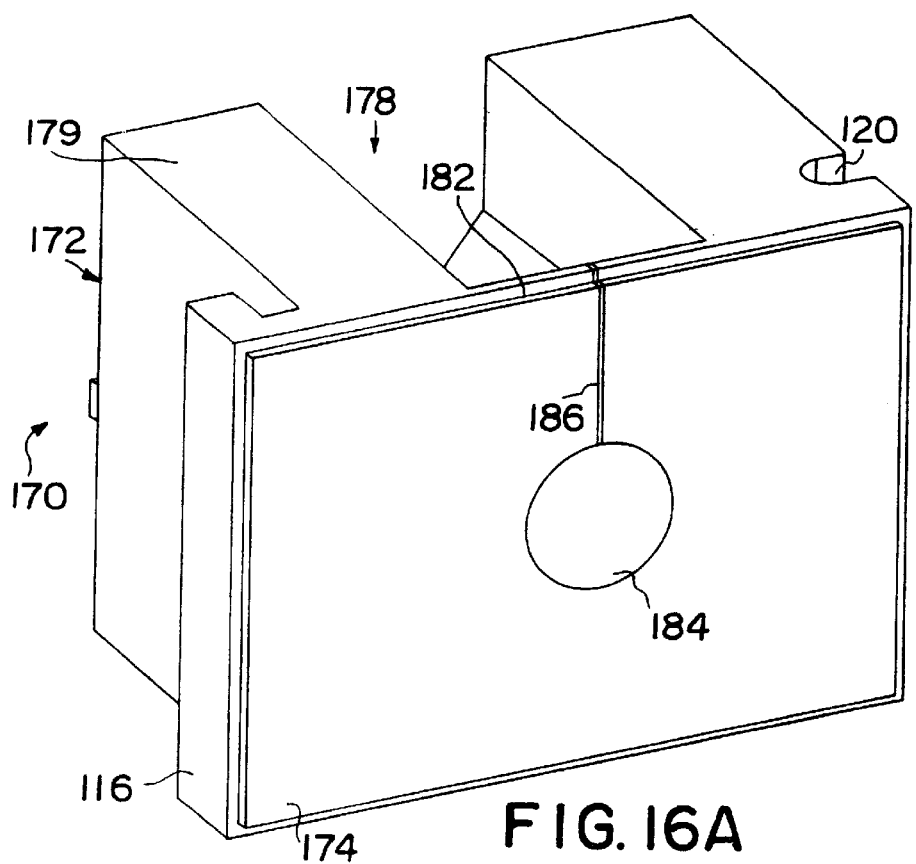
Figure 16B:
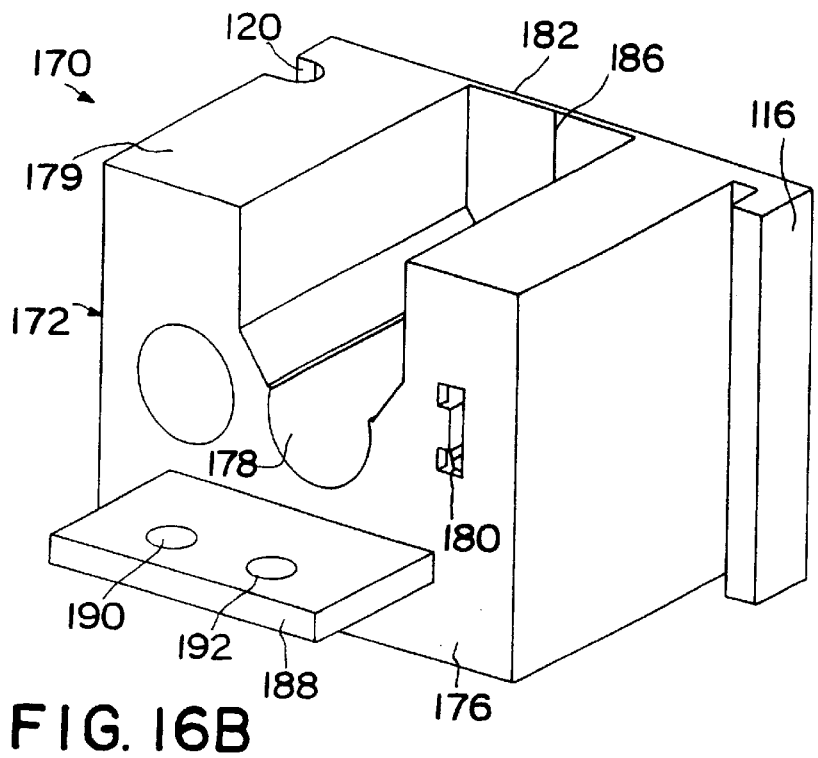
Figure 17:
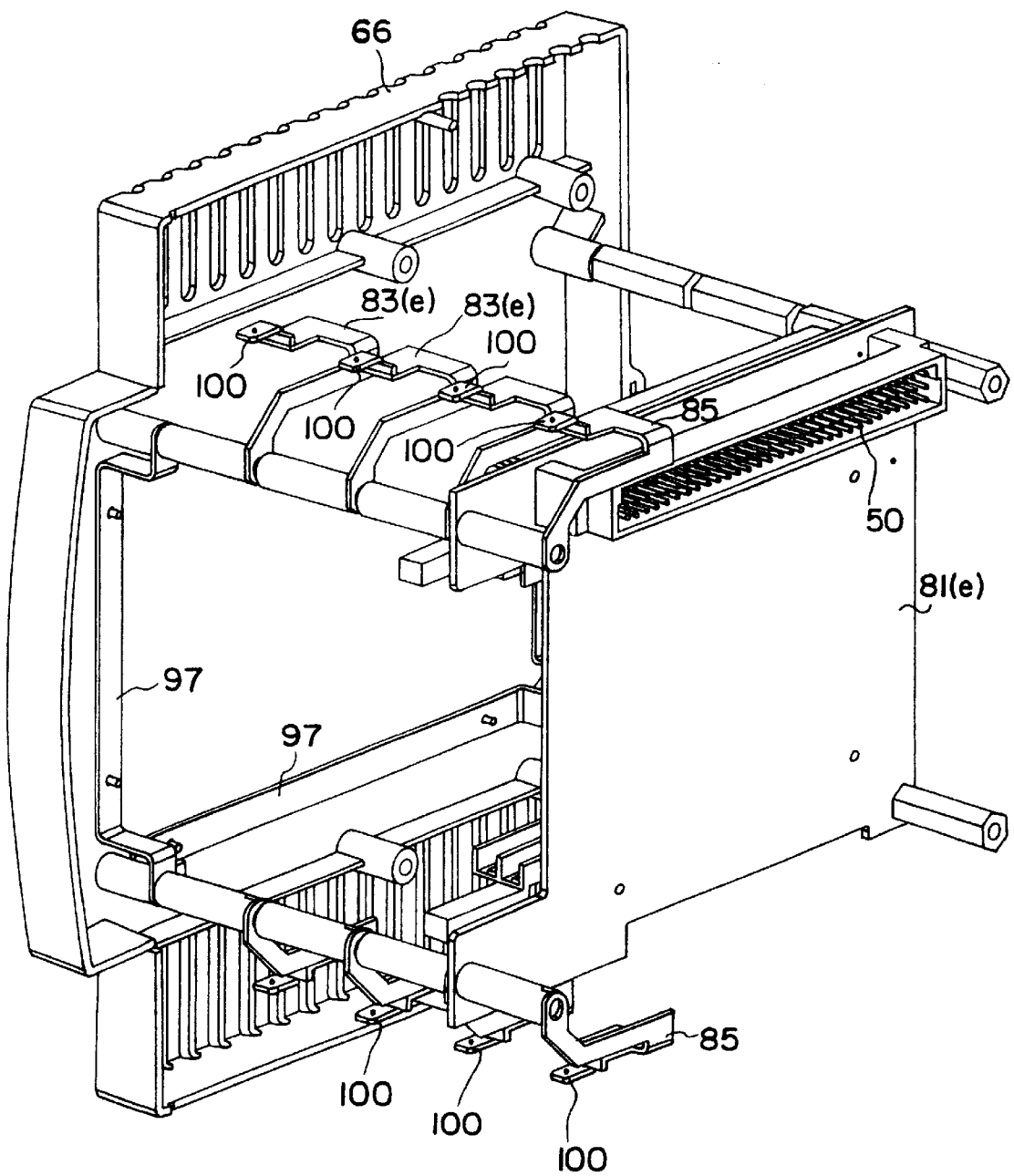

FIGS. "12A, 12B, 13A, 13B, 14A, 14B, 15A, and 15B" are perspective views of different embodiments of internal dongles;

FIGS. 16A and 16B are perspective views of a pass-through dongle;

FIG. 17 is a conceptual drawing of a ground bus in a field controller according to the invention.

DETAILED DESCRIPTION OF THE INVENTION

Figure 1:
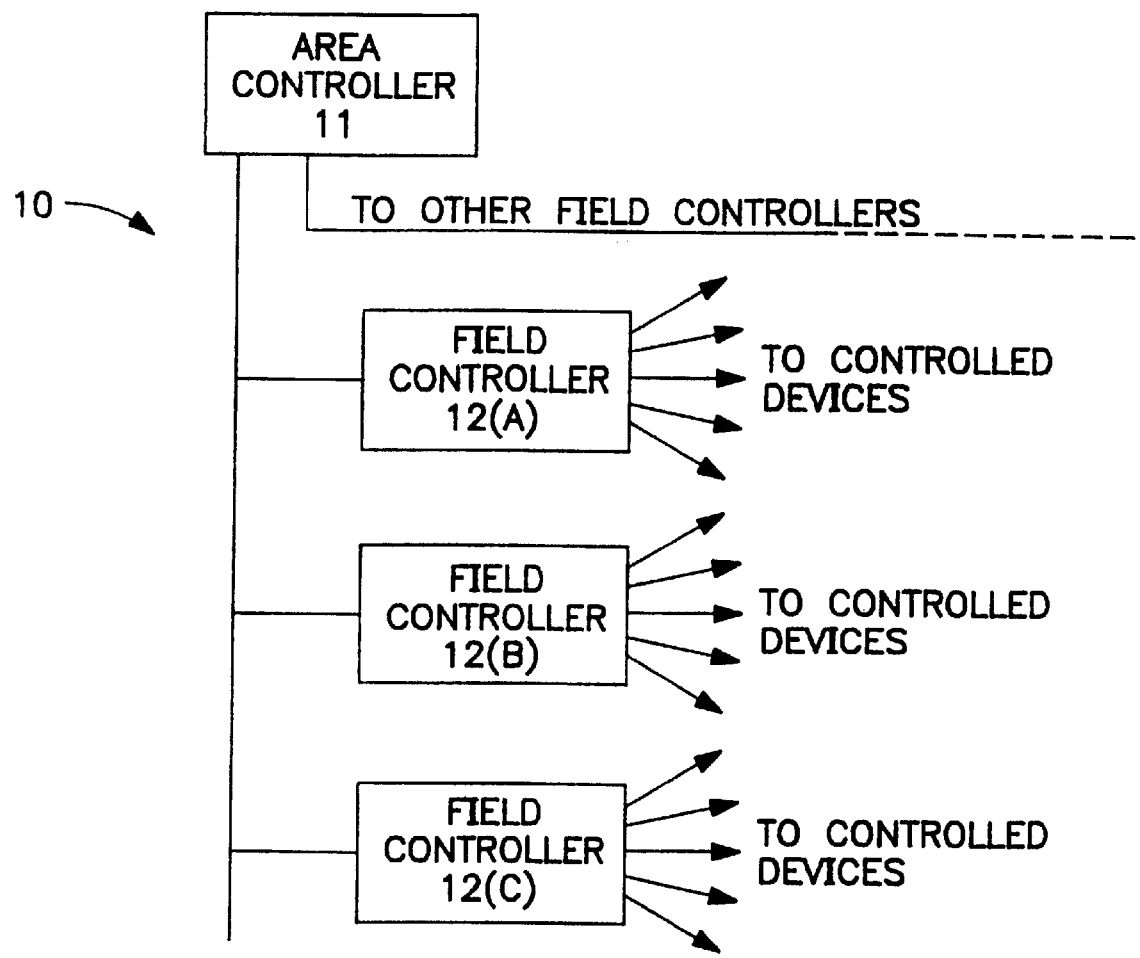
FIG. 1 is a functional block diagram of a distributed control system which includes a field controller constructed in accordance with the invention.

FIG. 1 is a functional block diagram of a distributed control system 10 which includes a field controller constructed in accordance with the invention. The distributed control system 10 may be used, for example, in a number of commercial, industrial and home applications, in particular to monitor and control a variety of diverse types of operations. For example, in a manufacturing operation, the distributed control system 10 may, for example, control various machines and robots to facilitate manufacture of those components that are manufactured on site, and transfer of the components from inventory to assembly locations where they are assembled into the final product. In such an operation, the distributed control system 10 will also receive status information regarding the operational status of the various machines controlled by the system, as well as, for example, the inventory of the various components which may be used in manufacture of the end product and the assembly line, which status information the system 10 may use in controlling the rate of component manufacture and product assembly. Similarly, in a chemical processing operation, the distributed control system 10 may control the rates of flow of chemicals within the operation, as well as reaction parameters such as temperatures, pressures and the like of the chemical reaction chambers, with the control being exercised in response to corresponding status information the system 10 receives from the controlled components of the processing plant. In a commercial or home application, the distributed control system 10 may monitor and control of a variety of environmental factors, including, for example, heating, air conditioning, ventilation, energy consumption and supply, and so forth.

The distributed control system 10 depicted in FIG. 1 provides for distributed control in a commercial, industrial or home environment operation. In the illustrative embodiment depicted in FIG. 1, the distributed control system 10 includes an area controller 11 and one or more field controllers 12(A) through 12(C) (generally identified by reference numeral 12(F)), which may be conveniently interconnected by a network 13 or other communications arrangement. Although only three field controllers are shown in FIG. 1, it will be understood that a greater or fewer number of field controllers may be connected to area controller 11. The area controller 11 maintains overall control of the industrial operation under control, or a portion thereof, thereby maintaining overall control of the manufacturing process. Each of the field controllers 12(F), under control of the area controller 11, controls a portion of the plant, and in particular controls specific elements of the plant, such as specific machines (not shown) in a manufacturing operation or specific valves and reaction chambers in a chemical processing plant. In addition, each field controller 12(F) will receive status information preferably from sensors (also not shown) in its assigned portion of the plant which indicate their status in the process under control. Depending on the control information and operational parameters provided by the area controller 11 to a field controller 12(F), the field controller 12(F) may, in response to the status information it receives from the sensors connected thereto, control the machines to perform selected operations as determined by their programming.

In addition, the field controller 12(F) may notify the area controller 11 if the status information indicates that an operation in its area is outside of a selected operational range, and the area controller 11 may initiate corrective procedures in connection therewith.

Figure 2:
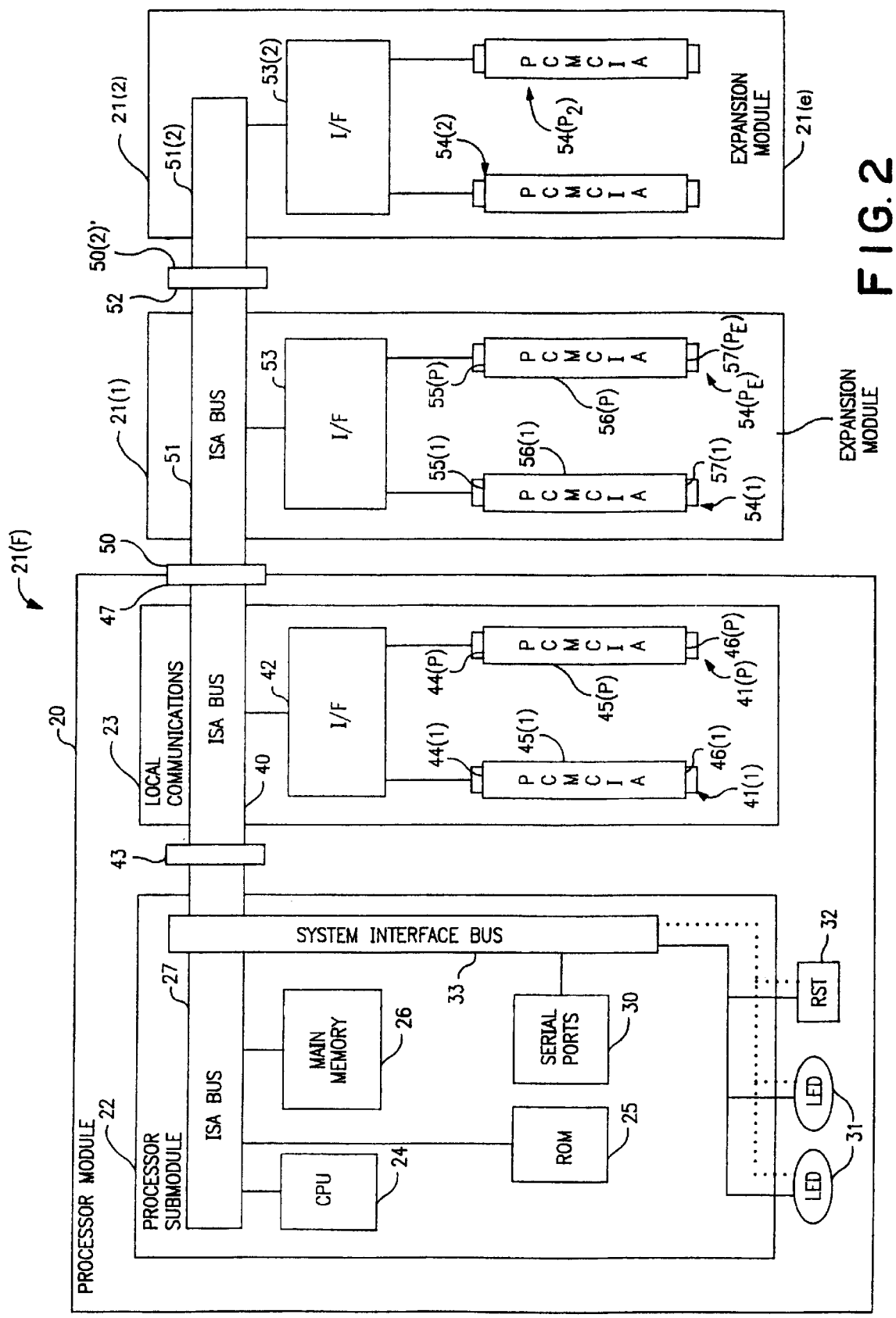
FIG. 2 is a functional block diagram of the field controller subsystem useful in the distributed control system which is depicted in FIG. 1.

FIG. 2 depicts a functional block diagram of a field controller 12(F) useful in the distributed control system 10. The field controller 12(F) comprises a plurality of modules, including a processor module 20 and one or more expansion modules 21(1) through 21(N) (generally identified by reference numeral 21(e)) whose electrical features are depicted in FIGS. 2. As will be described below, the modules 20 and 21(e) each have external connections which are positioned and configured to enable them to be connected together in a relatively compact manner. In addition, the modules 20 and 21(e) provide external interfaces to control devices in the factory environment. The entire field controller, comprising the processor module 20, one or more expansion modules 21(e), along with power supply and input/output devices which may be connected thereto (not shown) provides a very compact yet computationally powerful and easily maintainable package, which is convenient and quite useful in an industrial environment.

The processor module 20 comprises a processor submodule 22 and a local communications submodule 23. The processor submodule 22, in turn, includes a central processor unit (CPU) 24, a read only memory (ROM) 25 and a random access main memory 26, all of which are connected to a bus segment, such as, for example, ISA bus 27, and may also include other components as described below. The CPU 24 is preferably in the form of a microprocessor. The ROM 25 provides non-volatile storage which may be used for, for example, a BIOS (basic input/output system) portion of the operating system program that controls the CPU 24, and may also provide storage for certain other fixed operating information. The main memory 26, which may consist of one or more conventional DRAM (dynamic random-access memory) chips, provides storage for programs and data which may be down-loaded be the area controller 11 to enable the field controller 12(F) to operate, data received from the controlled devices and sensors controlled by the field controller 12(F), information processed by the CPU 24, and status information which may be retained for transmission to the area controller.

In addition to components 24 through 26, processor submodule 22 may include one or more external communication ports, such as, for example, serial ports 30. Ports 30 may be used, for example, for facilitating communications with the area controller 11. Processor submodule also includes devices such as light emitting diodes (LED) 31 for providing visual status indications, and devices for receiving local control input, such as a reset signal provided by a reset button (RST) 32. Processor submodule 22 may also include devices such as speakers (not shown) for generating audible alarm or status indications. All of these elements are indicated as being connected to ISA bus 27 over a system interface bus 33.

While ISA bus 27 conforms to the ISA bus specification, it will be appreciated that other types of busses may be used for a bus segment. Preferably, the bus segment will be in the form of a "multi-drop" bus, that is, it will facilitate the interconnection of more than two devices to facilitate the transfer of data and status information. In addition, the bus segment will preferably provide an interrupt facility, by which the central processor unit 24 can receive interrupt requests from other devices that are connected to the bus to notify it of conditions that may occur on an asynchronous or non-periodic basis which require servicing by the central processor unit 24, as will be described below.

The processor submodule 22 in one embodiment is preferably in the form of a single module having a form factor defined by the PCMCIA (Personal Computer Memory Card International Association) standard, with dimensions generally 3.375 inches long by 2.125 inches wide, by 0.25 inch deep, and having an ISA bus interface preferably along one of its long edges. A suitable processor sub-module 22 is currently sold by S-MOS Corporation as a model CARDIO™ 486 processor module, which provides the above-identified components and including an 80486-class microprocessor as the central processor unit.

The local communications sub-module 23 also includes a bus segment 40 and a plurality of PCMCIA interfaces 41(1) through 41(P) (generally identified by reference numeral 41(p)), which are interconnected by an interface controller chip I/F 42. The bus segment 40 of the local communications submodule 23 is logically similar to the bus segment 27 of the processor sub-module 22. In the described embodiment, in which the processor submodule's bus segment 27 conforms to the ISA bus specification, the local communication sub-module's bus segment 40 will also conform to the ISA bus specification. The local communications sub-module's bus segment 40 connects to the processor sub-module's bus segment 27 through a downstream connector 43.

The interface controller chip I/F 42 provides a connection from the bus segment 40 to the PCMCIA interfaces 41(p). Each PCMCIA interface in turn, provides a connection to a PCMCIA device, that is, a device which conforms to the electrical interface defined by the PCMCIA specification identified above. The PCMCIA specification defines, in addition to the PCMCIA form factor described above, an electrical interface which is essentially a point-to-point bus, that is, a bus which interconnects only two devices. (This is in contrast to the ISA bus specification which, as described above, defines a multi-drop bus, which can interconnect more than two devices.) Each PCMCIA interface 41(p) includes an interface connector 44(p) which connects to the interface controller chip 42, an interface card 45(p), and an external interface 46(p) which provides an interface to a controlled device (not shown) which may be located in the industrial environment, as described above. The interface card 45(p) is preferably constructed in the PCMCIA form-factor as described above, and provides circuitry which converts between PCMCIA signals provided by the interface controller chip 42 and signals transmitted to and received from the controlled device or sensor connected to the card 45(p). It will be appreciated that the particular circuitry provided in each interface card 45(p) will generally depend on the particular controlled device or sensor to which the card 45(p) is connected.

As described above, the processor module 20 provides an interface to two controlled devices through the local communications sub-module 23. To increase the number of devices which may be controlled by the local controller, one or more expansion modules 21(e) may be connected to the processor module 20. In particular, the local communications sub-module 23, in addition to providing a connector 43 to the processor module 22, also provides an upstream connector 47, which may be connected to an expansion module 21(1), as shown in FIG. 2.

Each expansion module 21(e), the physical structure of which will be described below, is electrically and logically similar to the local communications sub-module 23. That is, it is provided with a downstream connector 50, a bus segment 51, an upstream connector 52, an interface controller chip 53 and a plurality of PCMCIA interfaces 54(1) through 54(Pe) (generally identified by reference numeral 54(P)) which include an interface connector 55(p) which connects to the interface controller chip 53, an interface card 56(p), and an external interface 57(p) which provides an interface to a controlled device (not shown) which may be located in the industrial environment, as described above. In one embodiment, the maximum number of PCMCIA interfaces 54(Pe) that may be connected in an expansion controller, which also corresponds to the number of PCMCIA interfaces 41(p) which can be connected in the processor sub-module 20, is two, but it will be appreciated that an expansion module 21(e) may provide more or fewer interfaces than the processor module 20. The downstream connector 50 of the first expansion module 21(1) connects to the external connector 47 of the processor module 20, to connect the bus segment 51 of the first expansion module 21(1) to the bus segment 40 of the local communications sub-module 23, and thus to facilitate the transfer of signals from the processor sub-module 22 to the first expansion module 21(1). The bus segment 51 couples the signals from the downstream connector 50 to the upstream connector 52 for transfer to a further expansion module 21(2) through its downstream connector 50(2), if one is provided in the field controller 12(F). As in the local communications sub-module 23, the interface controller chip 53 couples signals between the bus segment 51 and the PCMCIA interfaces 54(Pe) which are provided in the first expansion module 21(1).

As noted above, the expansion modules 21(e) are all electrically similar (and are similar to the local communications sub-module 23 as described above). Accordingly, for each expansion module 21(e) after the first, the respective downstream connector 50(e) will connect to the upstream connector 52(e−1) of the preceding expansion module 21(e−1) in the series, and the upstream connector 52(e) will connect to the downstream connector 50(e+1) of the next expansion module 21(e+1) in the series, with the module's bus segment 51(e) coupling signals between the downstream connector 50(e) and the upstream connector 52(e). The interface controller chip 53(e) in the respective expansion module 21(e) connects to the bus segment 51 and the PCMCIA interfaces 54(Pe) allowing the expansion module 21(e) to connect to a number of controlled devices over respective PCMCIA interfaces (not shown). For each expansion module 21(e) the bus segments 27 . . . 40 . . . 51(e), interconnected by respective connectors 43, 47, 50(1), 52(1), 50(e), 52(e), provide a continuous path for carrying data and control signals from the central processor unit CPU 24 of the processor sub-module 22 to the respective local communications sub-module 23 and expansion module 21(e). The central processor unit CPU 24 is able to control the controlled device(s) through the PCMCIA interfaces 45(p) (as in the case of a controlled device connected to the local communications sub-module 23) or 54(Pe) (as in the case of a controlled device connected to an expansion module 21(e).

The field controller 12(F) further includes a module selection arrangement, which is described in detail in co-pending co-owned application Ser. No. 08/560,167, filed Nov. 20, 1995, the entire disclosure of which is included herein by reference. It will suffice to mention here that the processor sub-module 22 can select which of the local communications sub-module 23 or expansion module 21(e) is to receive signals transmitted by it (that is, the processor sub-module 22) on the respective bus segments 27 . . . 40 . . . 51(e), or which of the local communications sub-module 23 or expansion module 21(e) is to transmit signals to it (that is, the processor sub-module 22) onto the respective bus segments 27 . . . 40 . . . 51(e). The processor submodule 22 includes an addressing circuit that automatically assigns unique addresses to the PCMCIA cards, such that individual addressing of the PCMCIA cards is unnecessary.

The field controller 12(F) provides an architecture which may be conveniently implemented in a compact package which can be readily installed and maintained in a factory environment. One embodiment of such an implementation will be described below. The field controller of the described embodiment may be mounted on, for example, a vertical support such as a wall, with the processor module 20 (or, as it will be referred to below, the "head unit") and each expansion module 21(e) being generally configured so that, when an expansion module is added to the field controller 12(F), it will be connected to the head unit 20 or to previously-provided expansion modules so as to extend the field controller 12(F) in a direction which is generally parallel to a plane of the vertical support. Another embodiment, described in Ser. No. 08/560,167, may also be mounted on a vertical support, but the processor module and expansion modules are generally configured so that, when an expansion module is added to the field controller, it will be connected to the processor module or to previously-provided expansion modules so as to extend the field controller 12(F) in a direction which is generally transverse to a plane of the vertical support.

Figure 3:
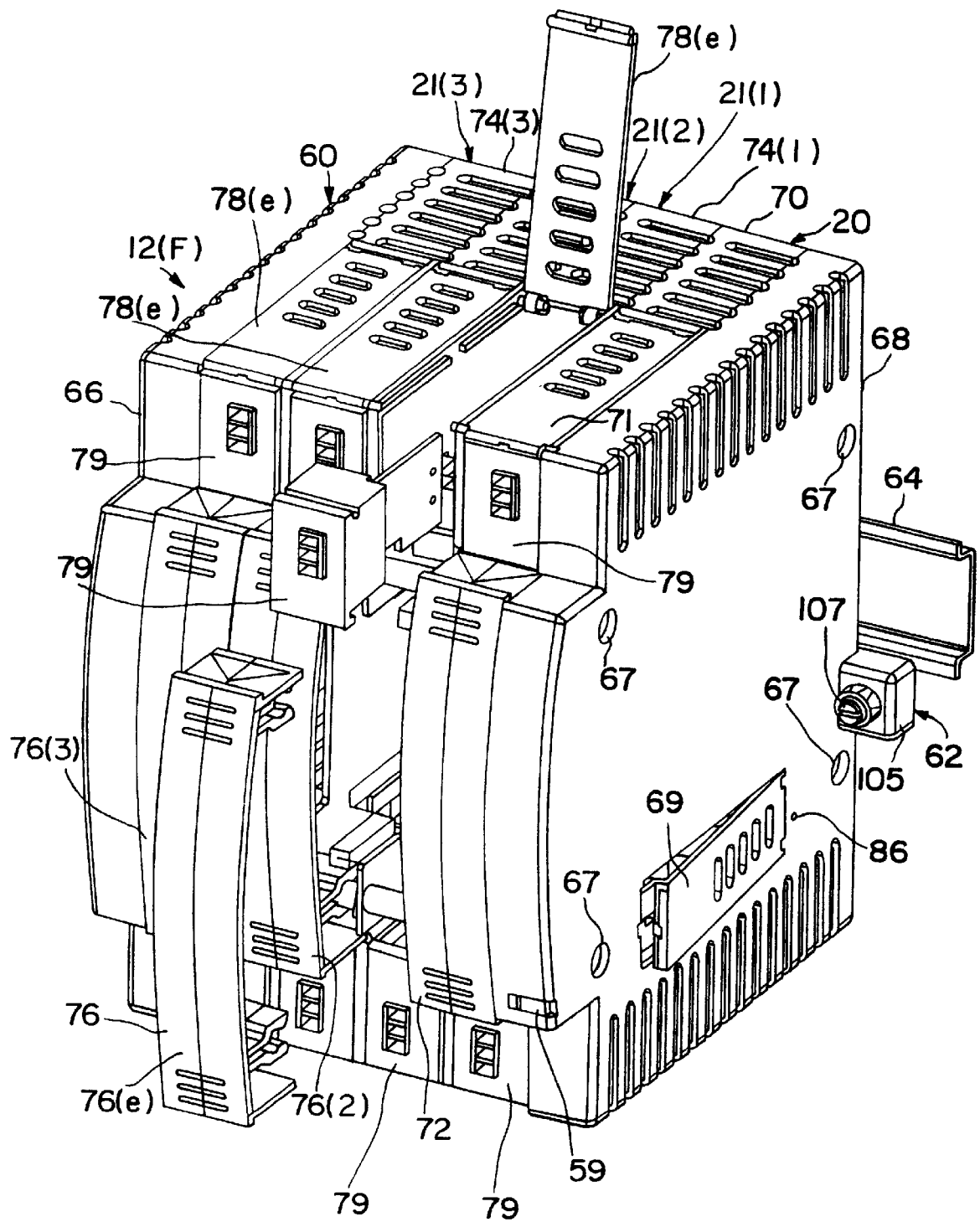
FIGS. 3 and 4 are perspective views of one embodiment of the physical structure of the field controller depicted in FIG. 2.

Referring now to FIG. 3, a field controller 12(F) includes at least a head unit 20 and may also include one or more expansion modules 21(e). It will be appreciated that the head unit 20 includes an implementation of the circuit elements of the processor module 20 described above in connection with the schematic diagram in FIG. 2, and the expansion modules 21(e) each include an implementation of the circuit elements of an expansion module 21(e) described above in connection with the schematic diagram in FIG. 2. The field controller 12(F) includes a segmented chassis having a segmented housing 60. Housing 60 has a rear mounting bracket 62 for mounting the field controller 12(F) onto a DIN rail 64, which may be attached to a wall or free-standing. The housing 60 includes a left side cover 66 and a right side cover 68. Right side cover 68 includes a hinged door 69 which provides access to electrical components inside the field controller 12(F) as will be described below. Sandwiched in between side covers 66, 68 is the head unit 20 and expansion modules 21(1), 21(2) and 21(3), each of which have respective housings.

Head unit 20 includes a head unit housing 70 that extends around top, rear and bottom sides, and a removable front cover 72 that provides access to the inside of head unit housing 70 when removed. Front cover 72 snaps in and out of engagement with connective elements within head unit housing 70 as will be described below. Head unit housing 70 also includes a top lid 71 which is hinged at its rear end to a primary portion of head unit housing 70 to allow access to the interior of housing 70 from the top when opened. A similarly configured bottom lid 73 (see FIG. 5) is hinged on a bottom side of housing 70 to allow access to the interior of housing 70 from the bottom when opened.

Expansion modules 21(1)–21(3) have identically configured expansion housings 74(1)–74(3), respectively (generally identified by 74(e)), which extend around top, rear and bottom sides of expansion modules 21(e). Each of the expansion housings 74(e) include a removable expansion front cover 76(1)–76(3) (generally identified by 76(e)) which is configured identically to processor front cover 72.

Each expansion front cover 76(e) snaps in and out of engagement with connective elements within the respective expansion housing 74 as will be described below. Removing an expansion front cover 76(e) provides access to the inside of its expansion housing 74(e). Each expansion housing 76(e) also includes a hinged top lid 78(e) and a similarly configured hinged bottom lid 75(e) (see FIG. 6). The top and bottom lids 78(e) and 75(e) of the expansion housings 74(e) provide access to the interiors of the individual expansion housings 74(e) from the top and bottom ends. All housing components 66, 68, 70, 71, 72, 74(e), 76(e), 78(e) and 75(e) are made of a molded thermoplastic, such as, for example Norel 190, which is supplied by General Electric Corp.

Each of the head unit housing 70 and expansion unit housings 74(e) provide a pair of recesses in which an I/O connector device 79 may be inserted. A variety of different I/O devices will be described in detail below. Each respective housing 70, 74(e) provides a first recess at a top end between the top of its front cover 72, 76(e) and its respective top lid 71, 78(e). A second recess is provided between the bottom of the front cover 72, 76(e) and its respective bottom lid 73, 75(e) (see FIGS. 5 and 6).

Figure 4:
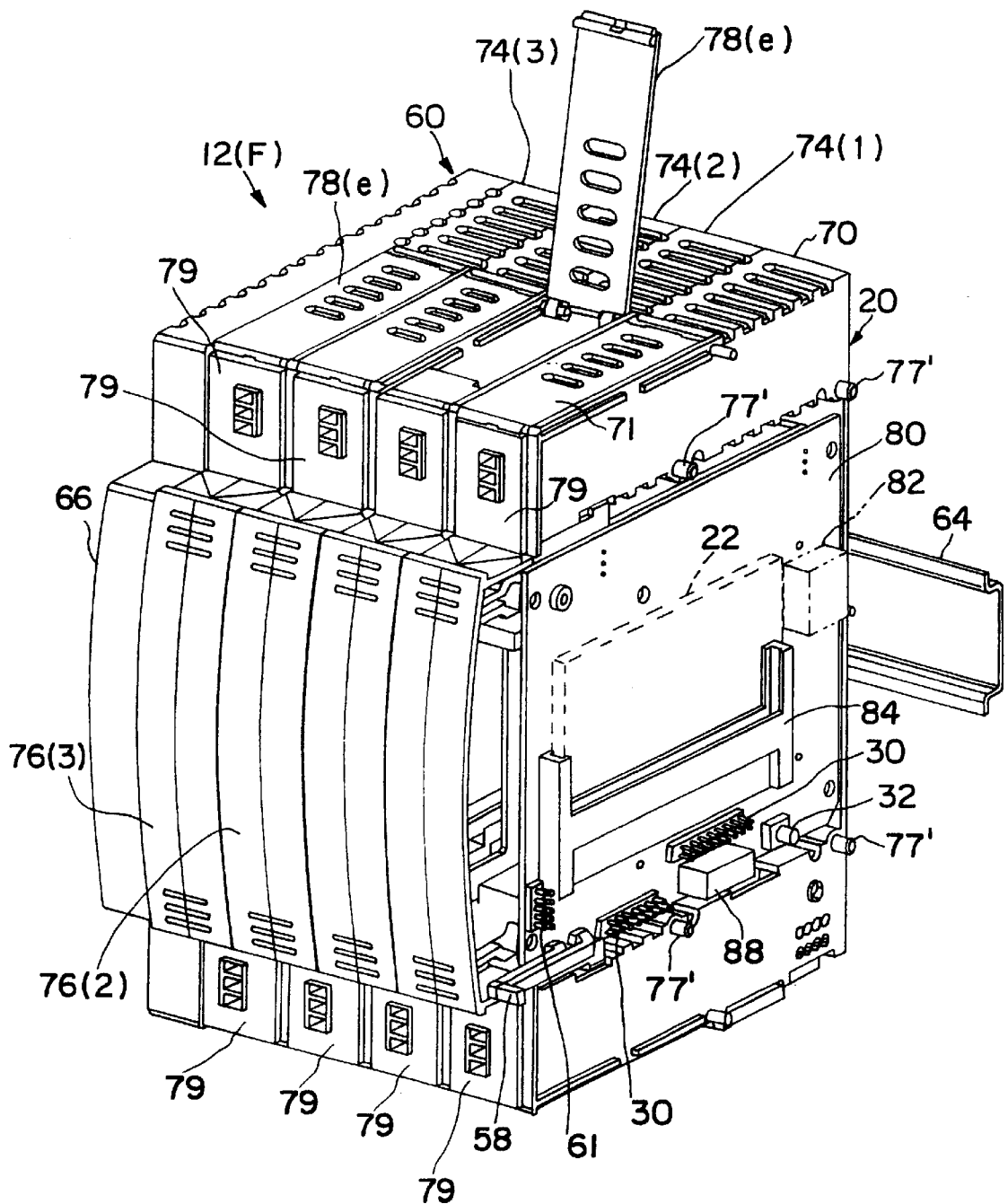

Referring now also to FIGS. 4, the field controller 12(F) is shown with the right side cover 68 removed, exposing the interior of head unit 20. Head unit 20 includes a head board 80 positioned inside head unit housing 70. The processor submodule 22 is mounted on the right side of the head board 80. An SMOS card embodying the processor submodule 22 is shown in shadow with broken lines mounted in a connector 84. SMOS card 22 is mounted in a plane parallel to the plane defined by headboard 80. Components mounted below connector 84 include the reset switch 32 which is accessible through an aperture 86 provided in right side cover 68 (see FIG. 3). Serial communication ports 30 are accessible through door 69 (see FIG. 3). Also included are a block 88 for connecting power, a transformer 82, and two light pipes 58 which bring light from LEDs 31 to an LED display 59 at the front of right side cover 68 (see also FIG. 3). An RS-232 connector 61 is also provided. Notice also, alignment pins 77' which help during assembly to align with apertures (not shown) formed in the inside of right side cover 68.

Figure 5:
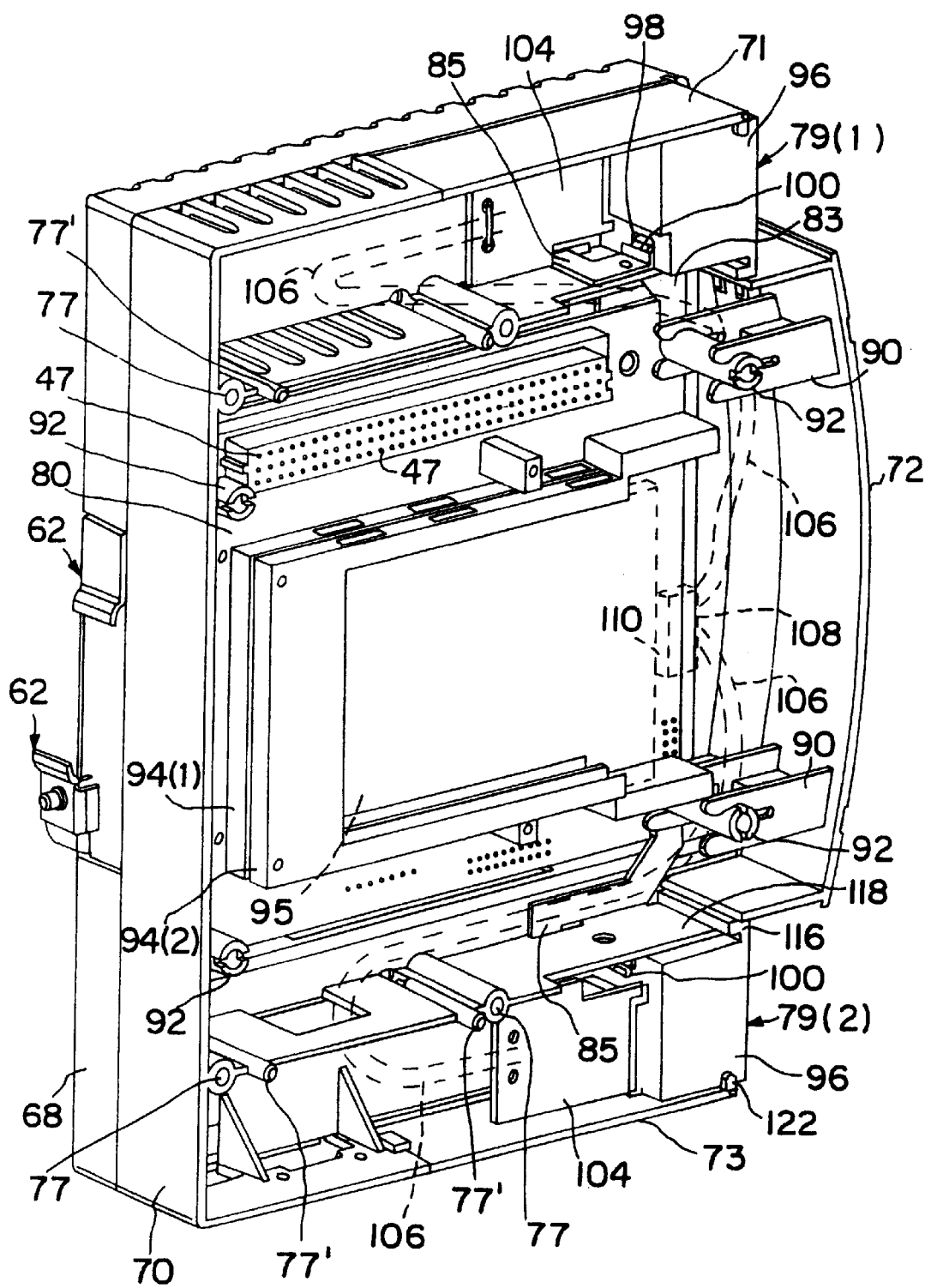
FIG. 5 is a perspective view of a head unit attached to a side cover.

Referring now also to FIG. 5, a different side of the interior of head unit housing 70 and headboard 80 is shown. Head unit front cover 72 includes connective brackets 90 which snap into and out of engagement with two front stand-offs 92. Head board 80 is held in place by the two front and two rear stand-offs 92, which couple on one side of head board 80 and on the other side of head board 80 to one of the left side cover 66 and an expansion module 21(e) (neither shown in FIG. 5). Right side cover 68 connects to the four stand-offs 92 with four screws (see FIG. 3) that screw into the right-most ends of stand-offs 92. Stand-offs 92 are held in place with respect to head unit housing 70 at least in part by ground straps 83 which form portions of a head unit ground bus 85. Head unit housing 70 is also held in position with respect to an adjacent expansion module 21(e) or left side cover 66 by receiving alignment pins 77'(e) (see FIGS. 7 and 10) formed on the adjacent expansion module 21(e) or cover 66 into alignment apertures 77. Head unit housing 70 also forms alignment pins 77' which fit into apertures 77(e) formed in an adjacent expansion housing 74(e) or the left side cover 66 (see FIGS. 7 and 10). Ground bus 85 is electrically coupled to DIN rail 64 through the stand-offs 92, which connect to a ground bus in the left side cover 66 that itself connects directly to the DIN rail 64, as will be described below.

Two peripheral connectors 94(1) and 94(2) are mounted in parallel, side-by-side arrangement on another side of head board 80. Each of connectors 94(1) and 94(2) are adapted to receive a PCMCIA card 95, one of which can be seen in dashed line shadow in FIG. 5. Also mounted in parallel alignment with head board 80 is an upstream expansion connector 47 for electrically coupling with a mating upstream expansion connector 50 on an expansion module 21(e) (see FIG. 7).

Referring now also to FIG. 6, one expansion module 21(e) is attached to the head unit 20. The following description applies equally to all expansion units 21(e) because they are configured identically. Expansion module 21(e) includes an expansion board, generally identified by 81(e), in the expansion housing 74(e). The expansion unit 20(e) illustrated in FIG. 6 is mechanically coupled to the head unit 20 between the head unit 20 and the left side cover 66, although there may be one or more other expansion modules 21(e) between the left side cover 66 and the expansion module located adjacent the head unit 20, as illustrated in FIGS. 3 and 4. Like head unit 20 and the side covers 66, 68, all expansion modules 21(e) are narrow units which are oriented orthogonal to the mounting plane of the field controller 12(F). Expansion board 81(e) is held in place by stand-offs, generally identified by 92(e), which connect to stand-offs 92 in head unit 20 in the configuration illustrated in FIG. 6. Expansion housing front cover 76(e) has brackets 90(e) which snap in and out of engagement with front stand-offs 92(e). Expansion housing 74(e) is held in place relative to expansion board 81(e) at least in part by two ground straps (only one visible in FIG. 6), generally identified by 83(e), that couple to front stand-offs 92(e). Each ground strap 83(e) forms a part of a ground bus 85(e) inside the expansion housing 74(e). Ground bus 85(e) connects to ground at the DIN rail 64 via the stand-offs 92(e), as does the ground bus 85 in the head unit 22.

Each expansion board 81(e) includes a pair of peripheral connectors 93(e1) and 93(e2) (generally identified by 93(e)) positioned on a side facing away from the head unit 20. Either or both of peripheral connectors 93(e) may receive a PCMCIA card 95(e). Peripheral connectors 93(e) and any attached PCMCIA cards 95(e) are aligned side-by-side in parallel with expansion unit board 81(e). Each expansion board 81(e) also includes an upstream expansion connector 52 on the same side as the peripheral connectors 93(e).

Figure 7:
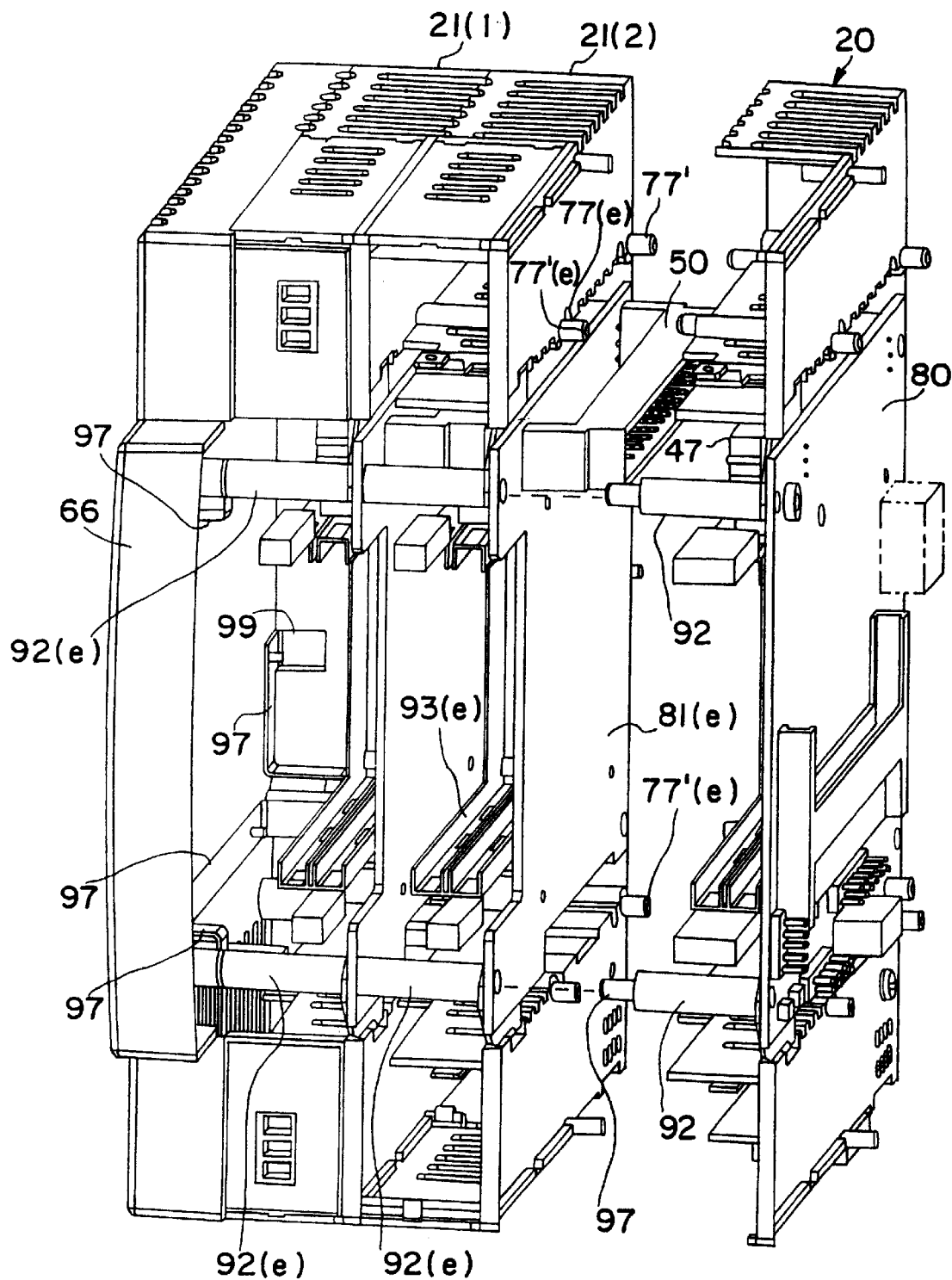
FIG. 7 is a perspective view of a side cover with two expansion modules attached, and a head unit positioned to be attached to one of the expansion units.

Refer now also to FIG. 7, which shows two expansion modules 21(1) and 21(2) already connected to the left side cover 66 and the head unit 20 aligned to be connected to the right most expansion module 21(2). A downstream expansion connector 50 is positioned on the side of the expansion board 81(e) nearest the head unit 20. Each upstream expansion connector 52 is adapted to connect to a downstream expansion connector 50 on another expansion board 81(e) in a different expansion module. The downstream expansion connector 50 on the right-most expansion module 21(2) connects to the upstream expansion connector 47 on the head board 80. The upstream expansion connector on the left-most expansion module 21(1) does not connect to anything because it is adjacent the left side cover 66.

Figure 8:
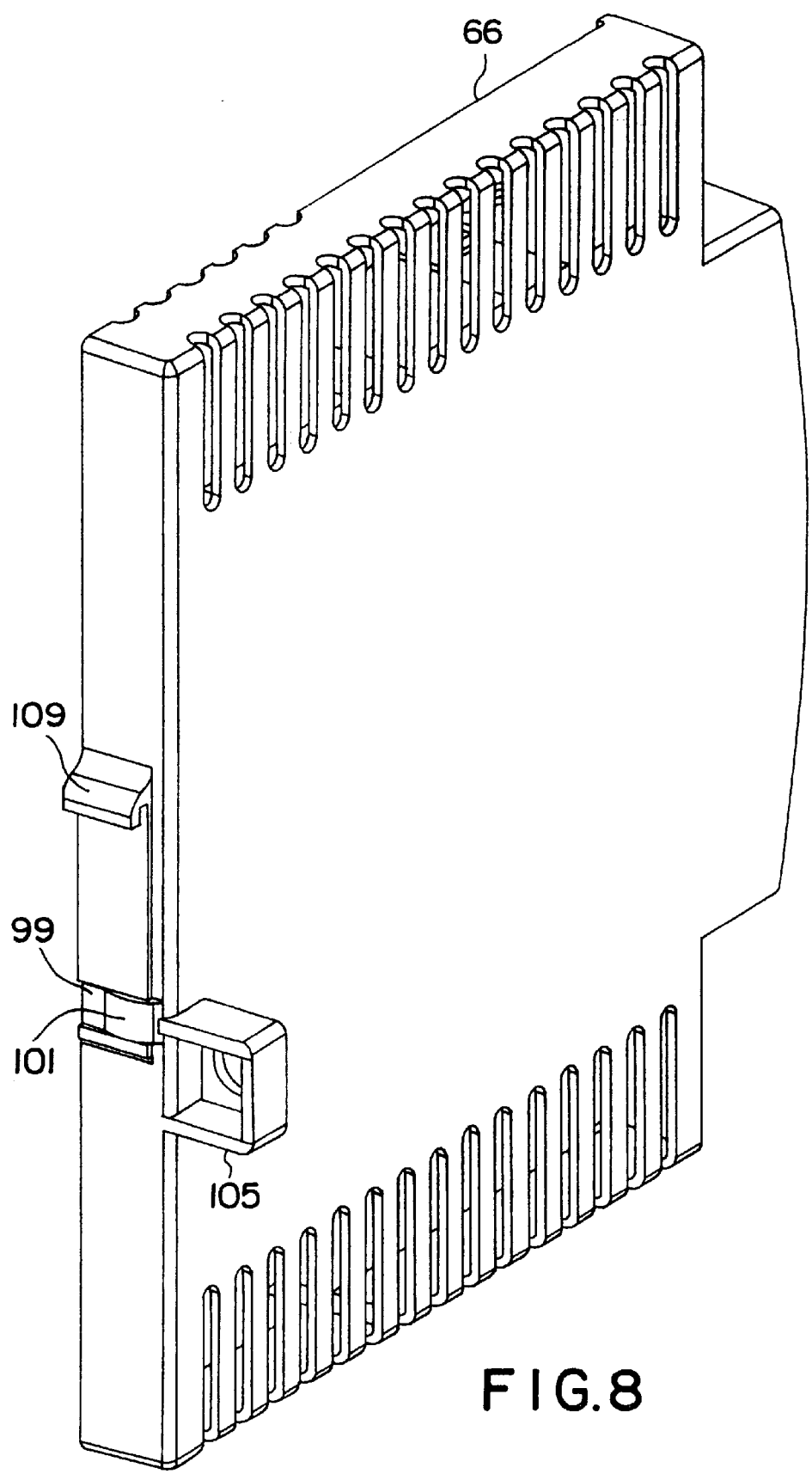
FIG. 8 is a rear perspective view of a left side cover.
Figure 9:
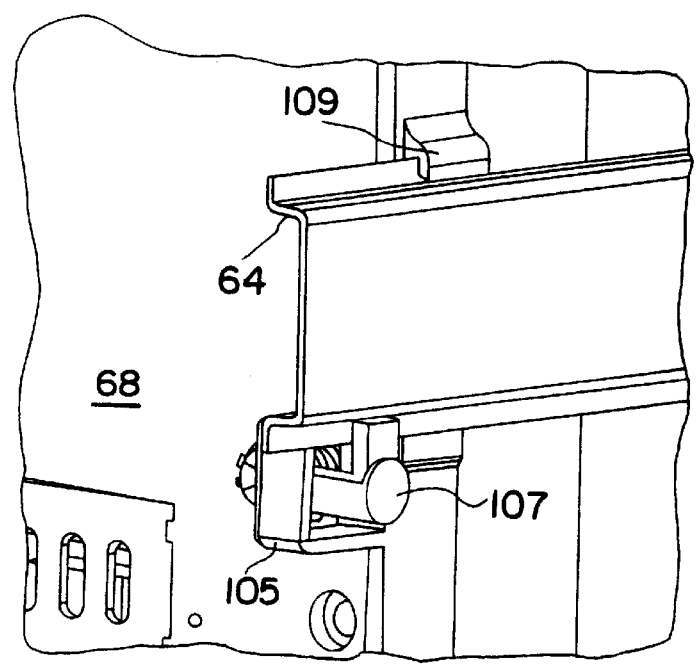
FIG. 9 is a detail of a mounting mechanism.

The expansion modules 21(1), 21(2) and the head unit 20 are also coupled together by the stand-offs 92, 92(e). Stand-offs 92 and 92(e) each include a threaded left end 97 that screws into the right end of the next left-most stand-off 92(e). Stand-offs 92(e) of expansion module 21(1) screw into threaded fittings in left side cover 66. The connected stand-offs 92, 92(e), which are made of a conductive metal, provide a ground bus that runs through the chassis and electrically couples to a ground line on each expansion board 81 and the head board 80. The two front stand-offs 92(e) which connect to the left side cover 66 connect to a ground strip 97 that extends between the front stand-offs 92(e) and also extends to an aperture 99 at the rear of the left side cover 66. Referring now also to FIG. 8, a spring-like portion 101 of ground strip 97 extends through aperture 99 for making electrical connection with a DIN rail. Referring also now to FIG. 9, which shows a detail of a mounting arrangement for the right side cover 68, each of the side covers 66, 68 includes a molded top hook 109 which is adapted to fit over the top edge of the DIN rail 64. After top hook 109 is placed over the DIN rail 64, a quarter-turn pawl 107 which extends through bracket 105 is turned upwards to engage the lower end of the DIN rail 64. Tightening the pawl 107 presses the spring-like portion 101 of the ground strip 97 into electrical engagement with the DIN rail 64, thereby providing a ground path for the field controller 12(F).

Referring again also to FIGS. 3–6, two I/O connective devices 79(1) and 79(2) are shown installed into head unit 20. I/O devices 79(1) and 79(2) are particularly configured for use with the described embodiment of field controller 12(F). We will refer to this type of I/O device hereinafter as an "internal dongle." Dongles usually refer to connecting cables that include a connector at each end and that also include some signal conditioning circuitry. We call the described I/O devices internal dongles because they are structured to be mounted to a device such that their front face forms a portion of the housing of the device and such that their cabling and circuitry are located within the chassis.

Figure 10A:
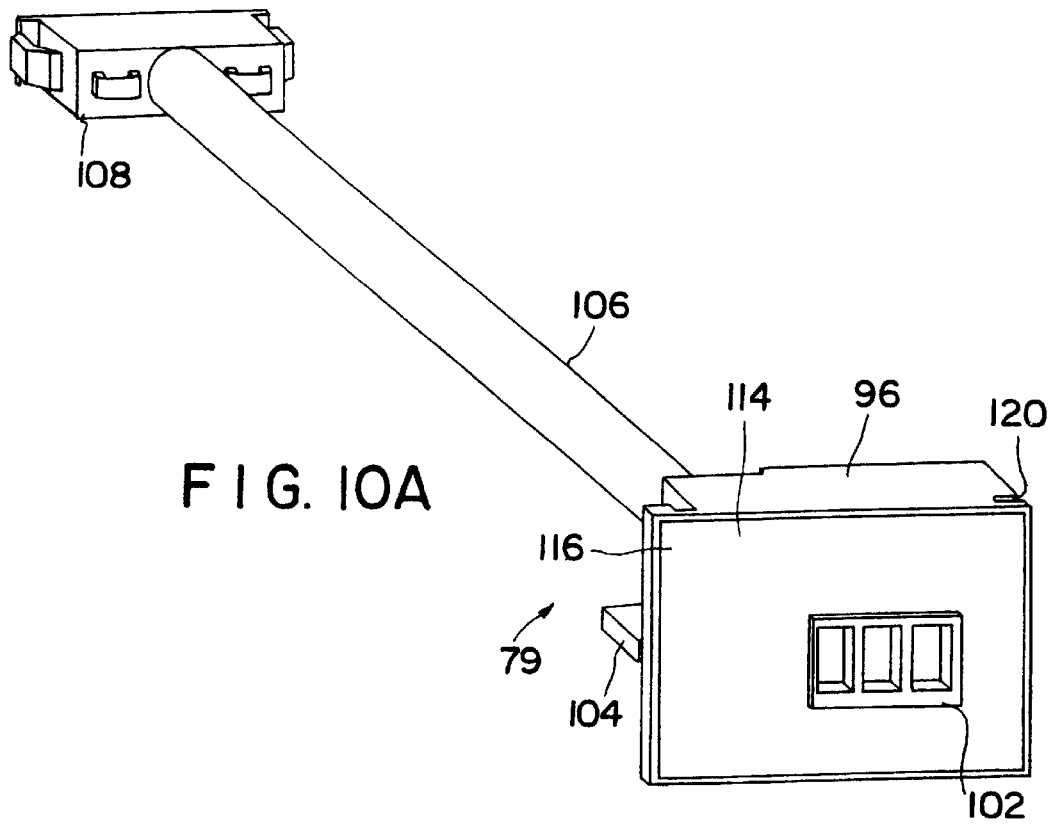
FIGS. 10A and 10B are perspective views of one type of internal dongle.
Figure 10B:
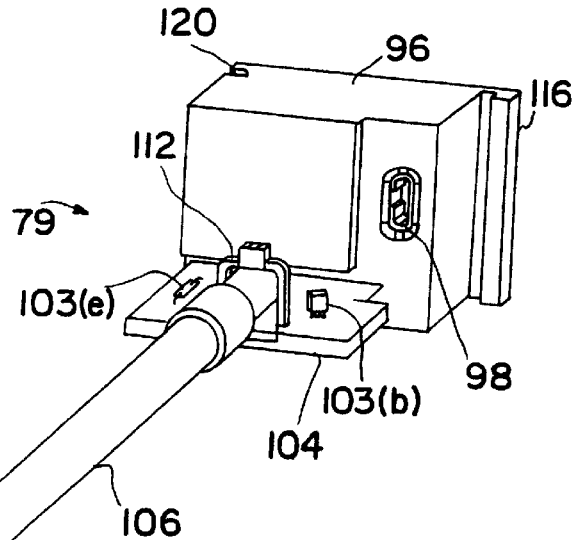
Figure 10B:
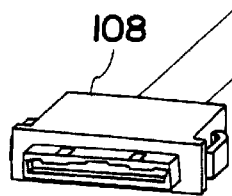

Referring now also to FIGS. 10A and 10B, which show a dongle 79 in isolation, each internal dongle 79 includes an injection molded, electrically insulating body 96 having connective structure arranged to removably attach the body 96 to the housing 60 of field controller 12(F). The connective structure includes a ground socket 98 adapted to connect to a fast-on type ground connector 100 mounted within housing 60. A circuit assembly includes an external connector 102 on the body 96 for electrically connecting to a cable (not shown) from a field controllable device. In the embodiment illustrated in FIGS. 10A and 10B, the exterior connector 102 is of a type for connecting to an Allen-Bradley device. A dongle circuit, which includes connective wiring and may also include passive circuitry 103(a) and active circuitry 103(b) for signal conditioning, is electrically coupled to the external connector 102 through the body 96. Some elements of the dongle circuit are located on a circuit board 104 which is mounted integrally on a rear end of the dongle body 96. An electronic cable 106 has one end electrically coupled to the dongle circuit on the circuit board 104, and its other end terminating with a connector 108 adapted to connect to an electronic component within the field controller housing 60. In the embodiment illustrated in FIGS. 10A and 10B, connector 108 is adapted for connecting to a mating connector 110 on a PCMCIA card 95. A cable strap 112 helps to relieve mechanical stress at the electrical connections between the circuit board 104 and the cable wires.

A rectangular-shaped forward facing front surface 114 of the dongle body 96 is structured to form, with the head unit housing 70 or an expansion module housing 74(e), a continuous outer surface of the housing 60 when the dongle body 96 is attached to the housing. As described above, the dongle body 96 includes a ground socket 98 which connects to a grounded fast-on type connector 100 within head unit housing 70 or expansion unit housing 74(e).

Internal dongles 79 also include other connective structures for assuring a secure mechanical connection with housing 70 or 74(e). One end of the body 96 includes a lip 116 that is hooked in a rearward direction to overlap the edge of a plate 118 within the housing 70 or 74(e). A surface of the body 96 located approximately opposite from the lip 116 forms a groove 120 that is adapted to engage with a bead 122 extending inward from a forward edge of each of the hinged lids 71, 73, 75(e), 78(e) when the lid is closed.

Figure 11:
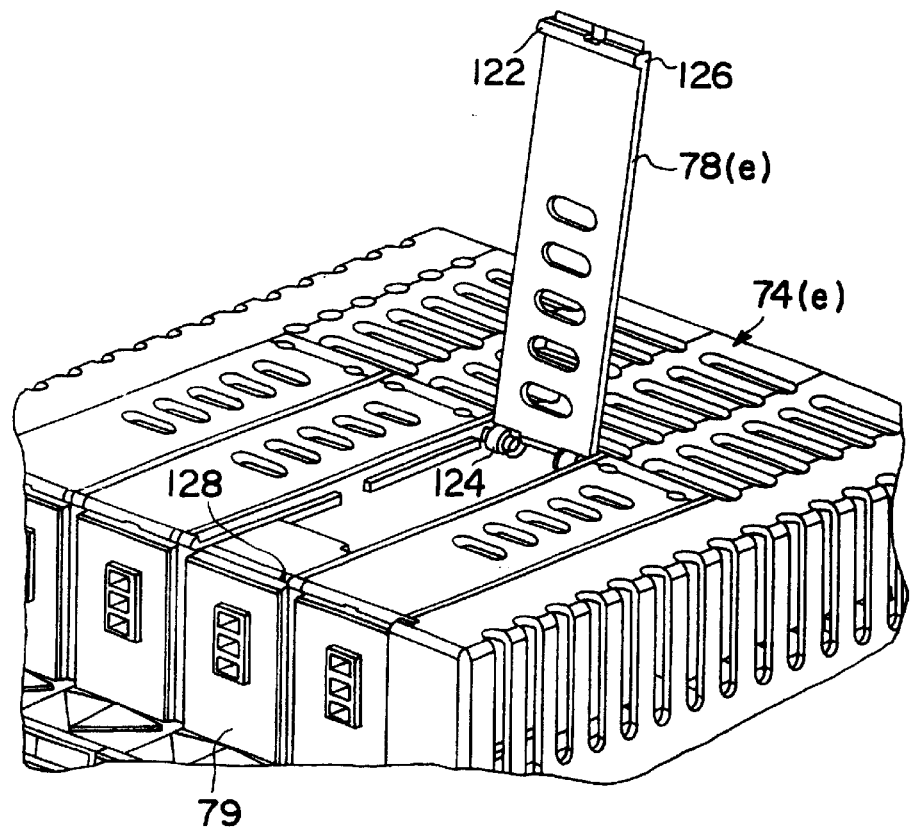
FIGS. 11 is a detail of a top portion of field controller 12(F)

A detail view of a top lid 78(e) is illustrated in FIG. 11. A dongle 79 in, for example, expansion housing 74(e) can be accessed with lid 78(e) in a raised position. One end of lid 78(e) is articulated at a rear end from a main portion of expansion housing 74(e) by hinge 124. The bead 122 at the forward end of raised lid 78(e) is clearly shown in the drawing. Also note a small tab 126 extending laterally from the forward end of the lid 78(e) near bead 122. Tab 126 snaps into and out of engagement with structure 128 formed in an adjacent module 21(e) or head unit 20.

Referring now again to FIG. 5, Dongles 79(1) and 79(2) are respectively installed in top and bottom recesses of head unit housing 70. Dongle cables 106 (shown in broken line shadow) are brought and rearward and bent around forward inside housing 70. Cables 106 are then brought around in front of front stand-offs 92, and brought forward again to couple their connectors 108 to mating connectors 110 on the PCMCIA cards 95. Front cover 72 is bowed outward to provide extra space to bring cables 106 around in front of PCMCIA cards 95. As illustrated in FIG. 6, a similar cable arrangement is used in the expansion modules 21(e). (In other figures, the dongle cables have been omitted to simplify the illustration.)

FIG. 17 is a conceptual drawing illustrating features of the ground bus for a field controller 12(F) with four expansion modules 21(e), however, only the expansion board (81e) of one is shown. Faston-type ground plugs 100, ground straps 85 and 83(e), stand-offs 92 and 92(e), and ground strip 97 on side cover 66 are shown. It can be seen that in between each pair of connected stand-offs (92 or 92(e)) are one ground strap (85 or 83(e)) and one circuit board (either 80 or 81(e)).

Figure 12A:
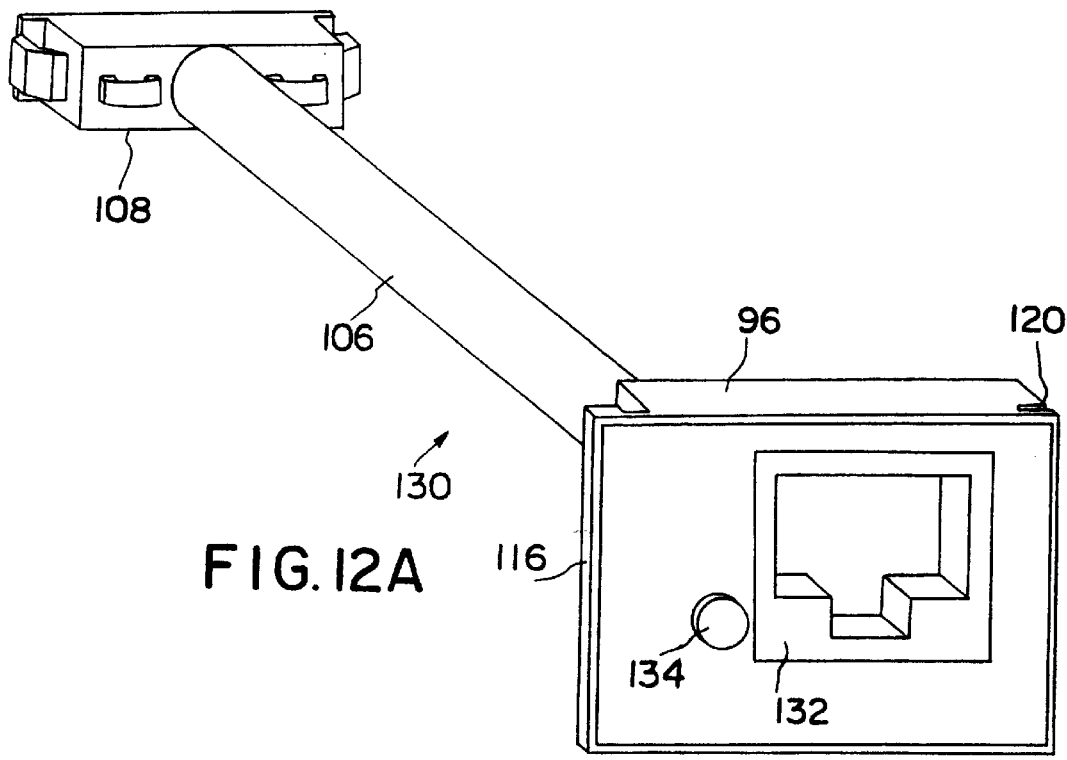
Figure 12B:
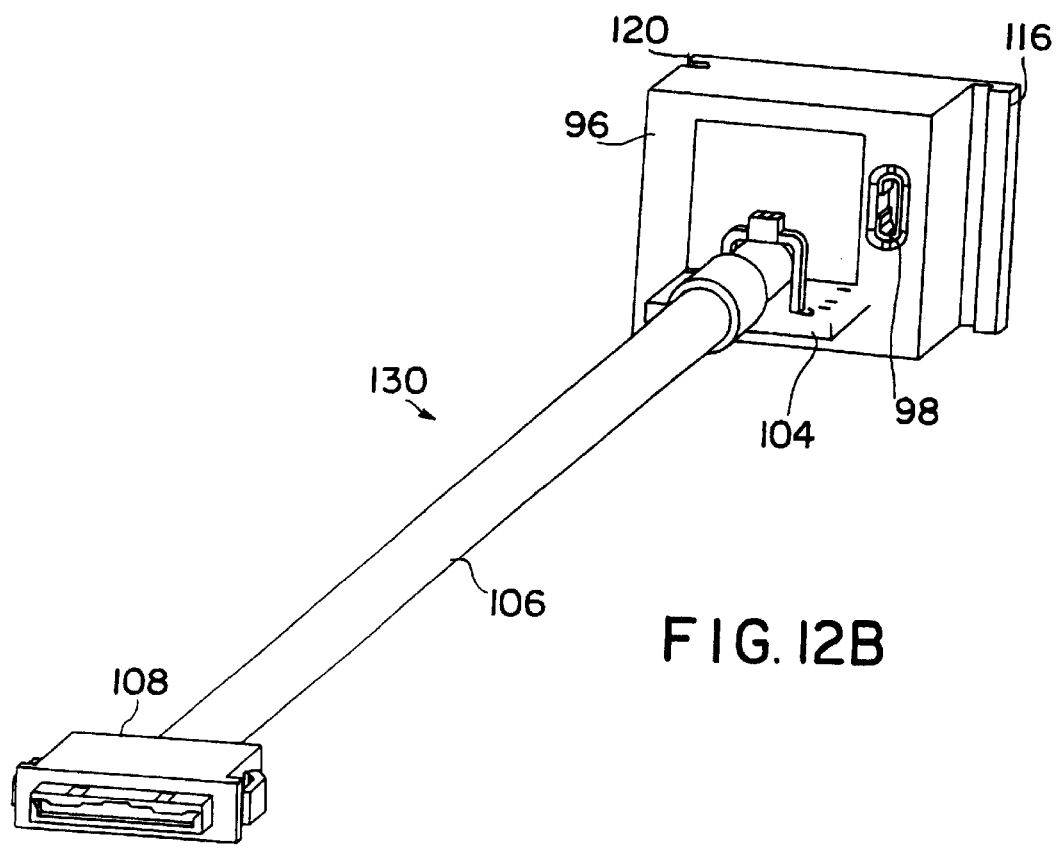

Other types of internal dongles will now be described. Referring to FIGS. 12A and 12B, an internal dongle 130 is shown having an external connector 132 on its front face for making a connection to an ethernet device. The dongle circuit includes an LED 134 to indicate an active status. Structurally, it is very similar to the Allen-Bradley type dongle 79 illustrated in FIGS. 10A and 10B, having a molded body 96, a fast-on type ground socket 98 on a rear side of the body 96, a circuit board 104, a cable 106, and a connector 108 for a PCMCIA card at the free end of the cable 106. Like dongle 79, dongle 130 includes active and passive circuitry.

Figure 13A:
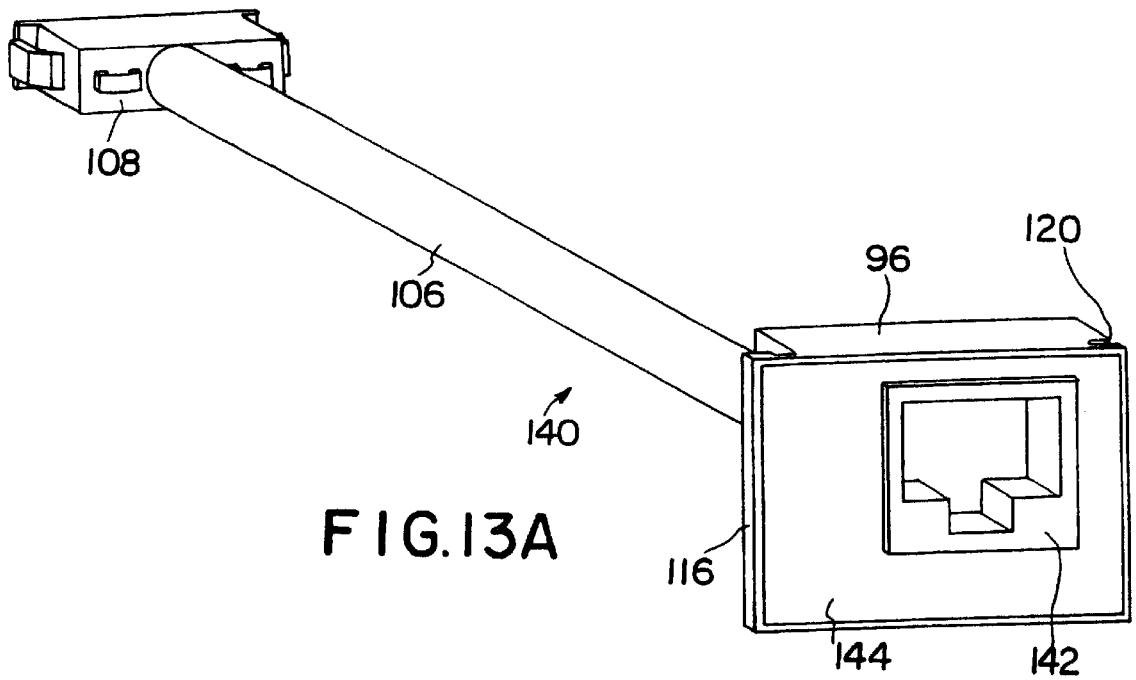
Figure 13B:
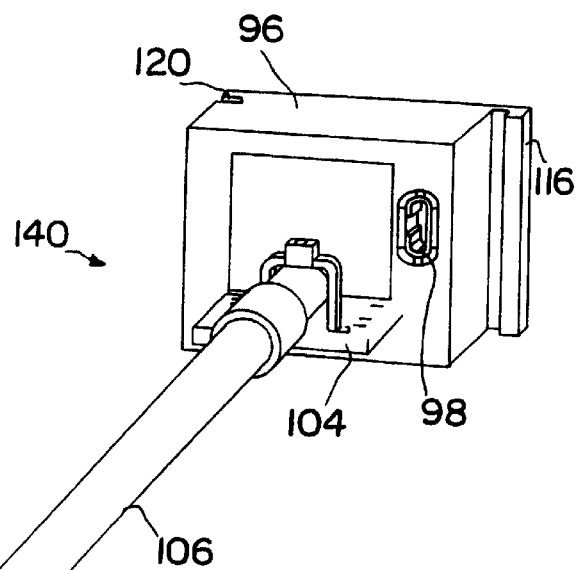
Figure 13B:
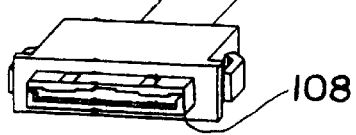

Another internal dongle 140 adpted for connecting to an ethernet cable is illustrated in FIGS. 13A and 13B. Dongle 140 has an ethernet connector 142 accessible on its front face 144.

Figure 14A:
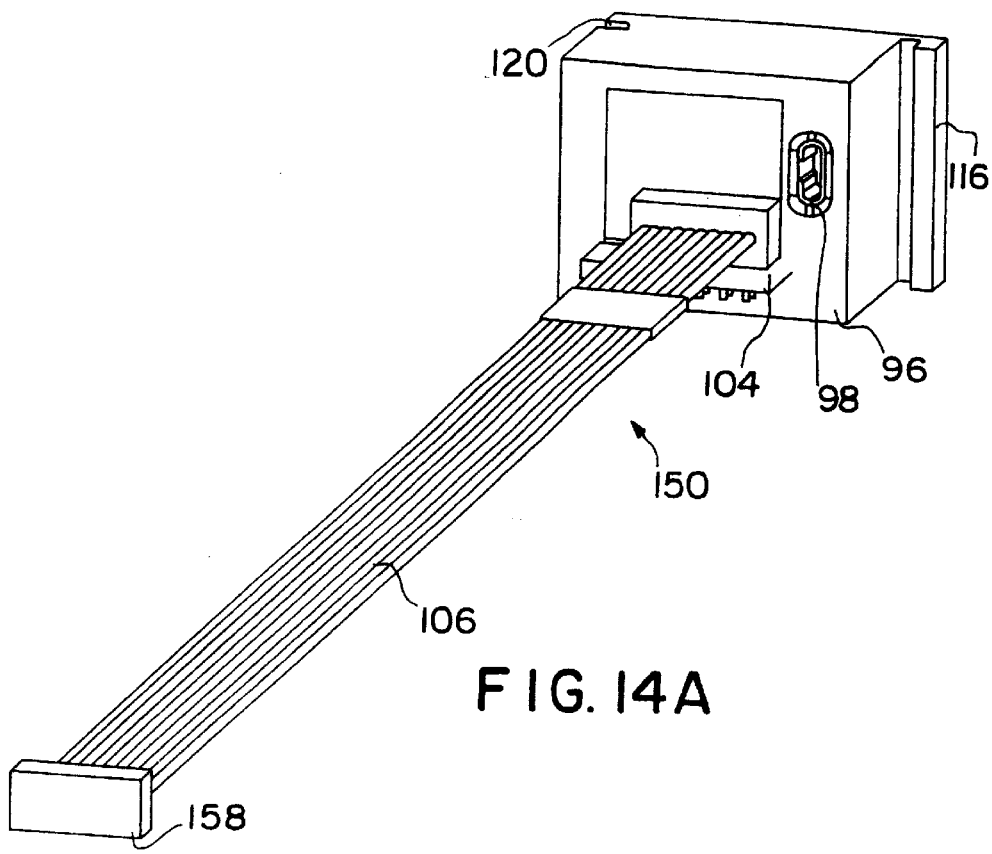
Figure 14B:
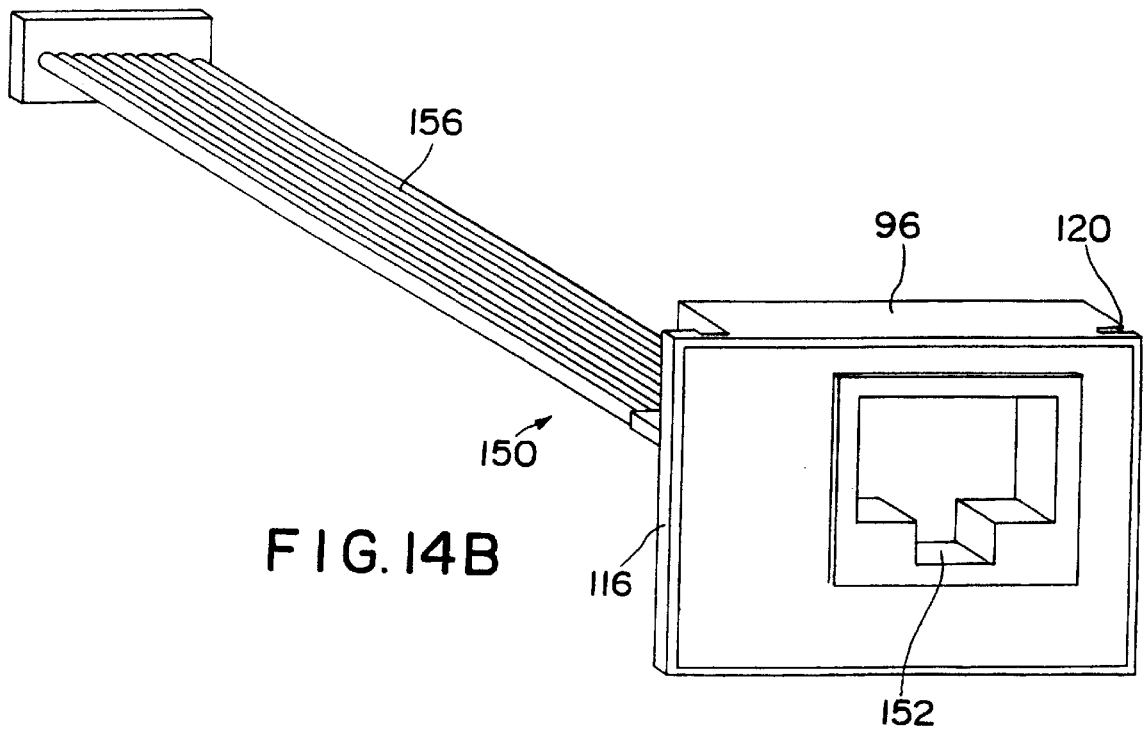

Yet another type of internal dongle 150 is shown in FIGS. 14A and 14B. Dongle 150 includes an exterior connector 152 for coupling to a controlled device, a ribbon cable 156 and an RS-232 connector 158 at the free end of the cable 156. Dongle 150 may be used in the head unit 20 to connect to the RS-232 connector 61 provided on the head board 80. Dongle 150 includes a transceiver.

Figure 15A:
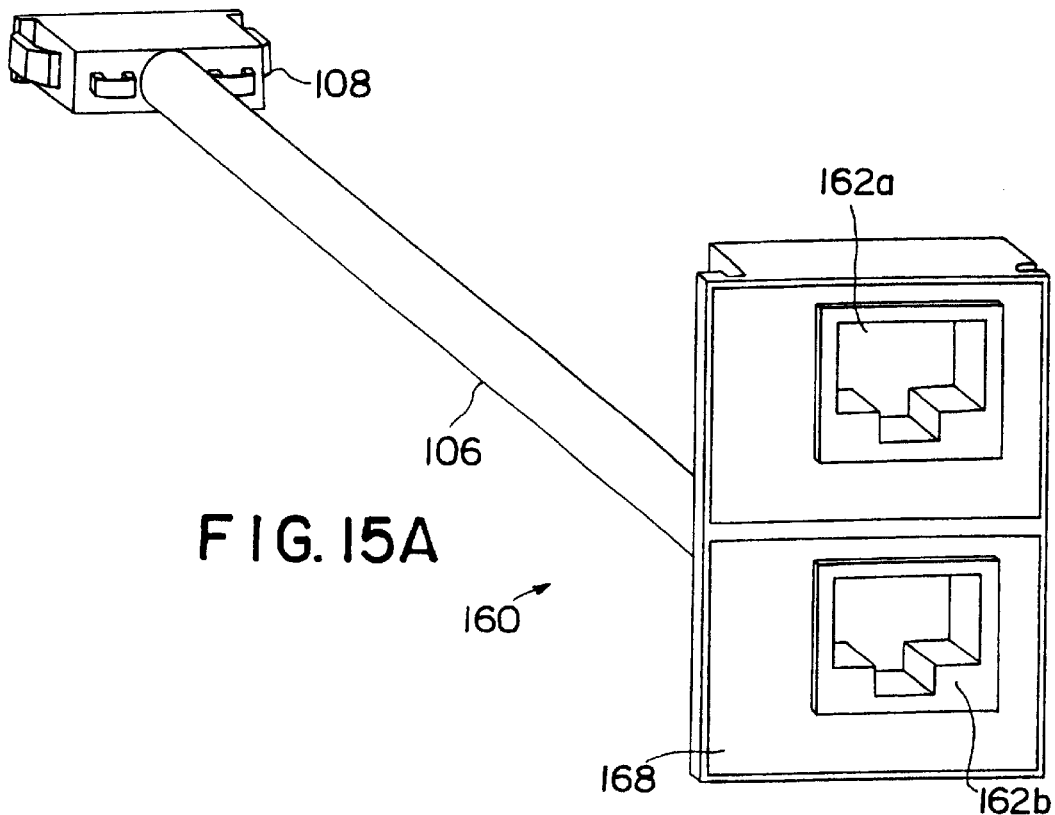
Figure 15B:
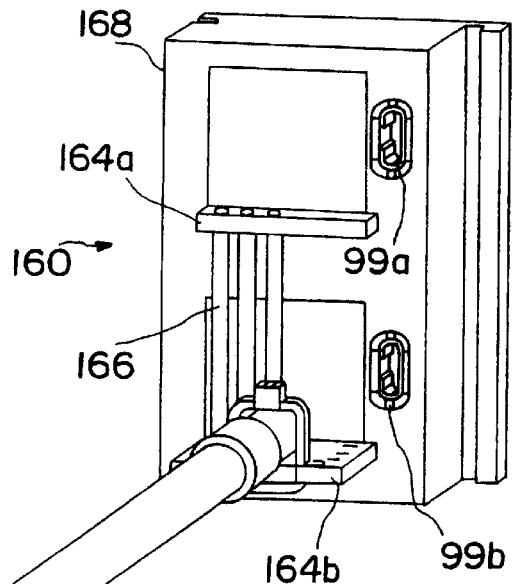
Figure 15B:
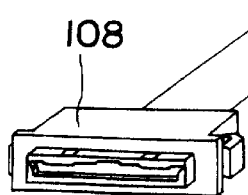

A double dongle 160 is shown in FIGS. 15A and 15B. Double dongle 160 includes a body 168 which is approximately twice the size of other dongle bodies to provide space for two exterior connectors 162a and 162b, which connect to two different external cables. Each of connectors 162a, 162b couple through body 168 to circuitry that is provided on a respective one of circuit boards 164a, 164b. The respective circuits are coupled by wires 166. A single cable 106 connects between board 154b and connector 168.

A pass-through dongle 170 is shown in FIGS. 16A and 16B. Pass-through dongle 170 is not a dongle in the usual sense, but is used to pass a cable through housing 60. Pass-through dongle 170 is formed of a single piece of an insulative injection molded material that is fairly rigid but has a degree of resilience and flexibility, such as, for example, hard rubber. Pass-through dongle 170 includes a substantially rectilinear, solid body 172, including front and rear ends 174, 176, four sides and a groove 178 extending from a side surface 179 into the body 172 from the front 174 to the rear end 176. The front end 174 forms a part of the housing 60 exterior when installed. The groove 178 is sized to allow a selected size electrical cable (not shown) to be carried therein. Like other dongles, pass-through dongle 170 includes connective structure adapted to removably connect the body 172 to the housing 60. An aperture 180 forms a socket to receive a faston-type ground plug 100. Lip 116 and groove 120 are structured as described above with reference to dongle 79.

Front end 174 forms a sheet 182 of nonconductive material that extends across the groove 178. The sheet 182 provides a circular opening 184 sized to allow the cable to pass therethrough. A slit 186 extends from the side surface 179 to the circular opening 184. The sheet 182 being integrally formed with the body 172, is fabricated of a resilient material structured to allow the cable to be inserted through the slit 186 and into the circular opening 184 such that the cable extends along the groove 178 and extends into the housing 60 from the rear end 176 of the body 172 when the body is connected to the housing 60. The rear end 176 of the body 172 forms a shelf or plate 188 adjacent the groove 178. Plate 188 has two apertures 190, 192 adapted to secure the cable with a cable tie or the like on either side of the cable.

While the invention has been described in connection with use of a processor sub-module 22 and interface cards having respective characteristics conforming to the PCM-CIA specification, such as the form factor and (in the case of the interface cards) electrical interface specification, it will be appreciated that the elements may have other form factors and interface specifications. In the described embodiments, however, the elements have generally the same form factors, and are relatively thin so that the head unit 20 and expansion modules 21(e) may be relatively thin facilitating relatively tight packing.

In addition, any bus including bus segments 27, 40, and 51 can be a multi-drop bus so that the PCMCIA interface cards for the various controlled devices can be connected anywhere along the bus.

In addition, while the new field controller 12(F) has been described as operating in a distributed control system 10 under control of an area controller 11, it will be appreciated that, depending on the particular application, area controller may not be necessary and the field controller may operate independently. In addition, it will be appreciated that a variety of devices may be controlled by a field controller as described herein, including other field controllers.

Moreover, the internal dongles described above are particularly adapted to be used in the described field controller 12(F). Other physical designs for internal dongles adapted to fit other electronic devices are also within the scope of the invention. Internal dongles adapted for making connections to external devices other than those described above are also within the spirit and scope of the invention.

Variations and modifications may be made to the invention, with the attainment of some or all of the advantages of the invention. It is the object of the appended claims to cover these and such other variations and modifications as come within the true spirit and scope of the invention.

What is claimed is:

1. An article adapted to pass a cable through a housing, comprising:

a substantially solid body, including front and rear ends, a side surface of the body providing a groove extending into the body from the front to the rear end, the groove being sized to allow a selected size electrical cable to be carried therein, and connective structure adapted to removably connect the body to the housing; and a sheet of nonconductive material extending across the groove at the front end of the body, the sheet providing a circular opening sized to allow the cable to pass therethrough and a slit extending from the side surface to the circular opening, the sheet being fabricated of a resilient material structured to allow the cable to be inserted through the slit and into the circular opening such that the cable extends along the groove and extends into the housing from the rear end of the body when the body is connected to the housing.

2. The article of claim 1, wherein said rear end of said body includes structure adapted to secure said cable.

3. The article of claim 2, wherein said structure adapted to secure said cable is comprised of a plate adjacent said groove, said plate being provided with a pair of apertures for securing a cable tie or the like on either side of said cable.

4. The article of claim 2, wherein said connective structure includes a socket adapted to receive a mating plug that is rigidly coupled to said housing.

5. The article of claim 4, wherein said socket is adapted to receive a faston-type plug.

6. The article of claim 4, wherein said article is an injection molding fabricated of a nonconductive, resilient material.

7. The article of claim 6, wherein said front end of said body, including said sheet of nonconductive material, forms a portion of an exterior of said housing when said article is connected to said housing.

8. The article of claim 7, wherein said article is generally rectilinear having four sides extending between the front and rear ends, the groove being formed in one of the sides.

9. The article of claim 8, wherein another of said sides of said body is provided with a second groove extending in a direction orthogonal to said first mentioned groove.

* * * * *